United States Patent [19]

Meyer et al.

[11] Patent Number: 5,212,224
[45] Date of Patent: May 18, 1993

[54] FREE FLOWING MOULDING MATERIALS BASED ON POLYAMIDES CONTAINING BISPHENOLS

[75] Inventors: Rolf-Volker Meyer; Friedrich Fahnler; Rolf Dhein, all of Krefeld; Martin Wandel, Dormagen, all of Fed. Rep. of Germany

[73] Assignee: Bayer Aktiengesellschaft, Leverkusen-Bayerwerk, Fed. Rep. of Germany

[21] Appl. No.: 486,002

[22] Filed: Feb. 27, 1990

Related U.S. Application Data

[63] Continuation of Ser. No. 333,739, Apr. 5, 1989, abandoned, which is a continuation of Ser. No. 189,723, May 3, 1988, abandoned, which is a continuation of Ser. No. 32,617, Apr. 1, 1987, abandoned.

[30] Foreign Application Priority Data

Apr. 11, 1986 [DE] Fed. Rep. of Germany ....... 3612159

[51] Int. Cl.$^5$ .......................... C08K 5/13; C08L 33/24

[52] U.S. Cl. ...................... 524/333; 524/336; 524/370; 524/377; 524/514; 524/538; 525/183; 525/184

[58] Field of Search ...................... 524/171, 343, 37 B, 524/333; 525/183, 184

[56] References Cited

U.S. PATENT DOCUMENTS 2,374,576 4/1945 Keine .................................. 260/18

FOREIGN PATENT DOCUMENTS 1196130 10/1985 Canada .
1203283 8/1970 United Kingdom .

*Primary Examiner*—Paul R. Michl
*Assistant Examiner*—Tae H. Yoon
*Attorney, Agent, or Firm*—Connolly & Hutz

[57] ABSTRACT

Polyamide moulding materials which have been impact-modified with diene and/or acrylic rubbers and can be processed by thermoplastic means and contain special diphenols.

8 Claims, No Drawings

FREE FLOWING MOULDING MATERIALS BASED ON POLYAMIDES CONTAINING BISPHENOLS

This is a continuation of application Ser. No. 333,739, filed apr. 5, 1989, abandoned, which in turn is a continuation of application Ser. No. 189,723 filed May 3, 1988, abandoned, which in turn is a continuation of application Ser. No. 32,617 filed Apr. 1, 1987, abandoned.

The invention relates to moulding materials based on polyamides which have been impact-modified with diene or acrylic rubbers and can be processed by thermoplastic means and contain special diphenols.

The known high quality of the pattern of properties of polyamides which can be processed by thermoplastic means depends essentially on the hydrogen bridges which are effective between separate carboxamide groups. The hydrophilic character caused by the polarity of the carboxamide groups also has a considerable influence on this, since it causes a distinctly measurable water absorption both when the material is stored in water and in a standard climate (see, for example, Kunststoffhandbuch (Plastics Handbook) Volume VI, Polyamides, Carl-Hanser-Verlag, Munich, 1966, pages 458 et seq.).

Thus, for example, the impact strength of shaped articles made from polyamides depends considerably on the water content of the shaped articles. In the anhydrous state, for example after the production of the shaped articles by injection-moulding, the shaped articles produced from readily flowing and hence readily processable polyamides of average molecular weights are, in particular, relatively sensitive to impact stress. This applies particularly to shaped articles made from partly crystalline polyamides.

The toughness of these shaped articles can, admittedly, be improved markedly by conditioning with water. Parallel with this, however, there occurs a softening of the products which is evident with particular clarity as the result of a drastic reduction in the stiffness, measured by the modulus of elasticity.

The toughness level of unmodified polyamides, in particular at temperatures below room temperature, is not satisfactory for many fields of use, for example for instrument housings, but particularly also for functional components and body components in the automobile field.

A large number of measures have been suggested to improve this, for example mixing in certain elastomeric polymers. Thus, inter alia, polyethylenes, copolymers of ethylene with polar comonomers, such as vinyl acetate or (meth)acrylic acid (esters) are suggested as additives for improving toughness, or suitably modified rubbers, such as, for example, copolymers formed from butadiene and acrylonitrile.

An improvement in the toughness of the products is achieved in all cases. However, depending on the type and amount of the component added to improve the toughness, the flow of the products is impaired and their processability is thus rendered more difficult.

This applies particularly to the production of mouldings having a large surface, such as are desired increasingly in the construction of automobiles, such as, for example, body components, spoilers and bumpers, where surface blemishes can occur on finished parts merely as a result of processing problems, or, because of the poor flow of, for example, blends of polyamides and rubber elastomers, the moulds can frequently in fact only be filled with difficulty.

The practical consequence of this is that, in order to fill moulds, in particular for mouldings having a fairly large surface, more and more sprues are required, that is to say the moulds have to become increasingly complicated, and that, as a further consequence of the sprues, undesirable joint lines are formed, which can impair the optical and mechanical properties of the mouldings in use.

There is therefore a need for moulding materials based on impact-modified polyamides which have good technical properties in use and which are distinguished by improved flow and hence improved processability and higher stiffness, that is to say which do not have the disadvantages mentioned above.

It has now been found, surprisingly, that the disadvantages mentioned above can be overcome and, in particular, the flow of products intended for the preparation of polyamide moulding materials which have been impact-modified by means of diene and/or acrylic rubbers can be improved drastically if the products are modified with special bisphenols.

The invention therefore relates to polyamide . moulding materials which can be processed by thermoplastic means and contain diene and/or acrylic rubbers, characterized in that the moulding materials contain 3–40% by weight, preferably 5–35% by weight and particularly preferably 10–30% by weight, relative to the polyamide content, of bisphenols of the general formula I

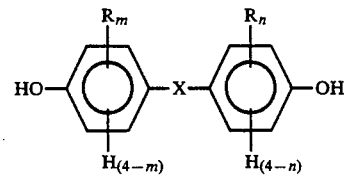

wherein m and n independently of one another denote integers from 0 to 4, preferably 0, 1 or 2 and particularly preferably 0;

the Rs represent a methyl, methoxy and ethyl group, preferably a methyl group, and X denotes a chemical bond or a divalent, aliphatic $C_1$–$C_7$-, preferably $C_1$–$C_3$-hydrocarbon radical, a cycloaliphatic C5-C6-hydrocarbon radical or a bridge member, such as O, S, SO, $SO_2$, CO or —$O(CH_2)_pO$- in which p is 2–10, preferably 2 or 4, subject to the proviso that the sum of the aliphatic C atoms in all the radicals R attached to a phenol ring is <6, preferably <3.

X is preferably a chemical bond, a $C_1$–$C_3$-alkylene radical, O, S or $SO_2$, particularly preferably —$CH_2$-, —$C(CH_3)_2$- or $SO_2$.

The following are examples of the bisphenol groups to be employed in accordance with the invention: dihydroxydiphenyls, bis-(hydroxyphenyl)-alkanes, bis-(hydroxyphenyl)-cycloalkanes, bis-(hydroxyphenyl) sulphides, bis-(hydroxyphenyl) ethers, bis-(hydroxyphenyl) ketones, bis-(hydroxyphenyl) sulphoxides, bis-(hydroxyphenyl) sulphones and α,α-bis-(hydroxyphenyl)-diisopropylbenzenes.

The following are representatives of the groups of bisphenols mentioned which are to be employed in accordance with the invention: 4,4'-dihydroxybiphenyl, if appropriate, mixed with 2,4'-dihydroxybiphenyl, 4,4'- dihydroxy-3,3′,5,5′-tetramethylbiphenyl, 4,4′-dihydroxy-3,3′-dimethylbiphenyl, bis-(4-hydroxyphenyl)-methane, bis-(4-hydroxy-3,5-dimethylphenyl)-methane, bis-(4-hydroxyphenyl)-ethane, 2,2-bis-(4-hydroxyphenyl)-propane ("bisphenol A"), 2,2-bis-(4-hydroxyphenyl-3,5-dimethylphenyl)propane, 2,2-bis-(4-hydroxy-3,3′-dimethylphenyl)-propane, 1,1-bis-(4-hydroxyphenyl)-cyclohexane, 1,1-bis-(4-hydroxy-3,5-dimethylphenyl)-cyclohexane, bis-(4-hydroxyphenyl) sulphone, bis-(4-hydroxy-3,3-dimethylphenyl) sulphone, bis-(4-hydroxy-3,3-dimethylphenyl) sulphone, bis-(4-hydroxyphenyl) sulphide, bis-(4-hydroxy-3,5-dimethylphenyl)-sulphone, bis-(4-hydroxyphenyl) oxide, bis-(4-hydroxy-3,5-dimethylphenyl) oxide, bis-(4-hydroxyphenyl) ketone, bis-(4-hydroxy-3,5-dimethylphenyl) ketone, bis-(4-hydroxy-3,3′-diethylphenyl)-propane.

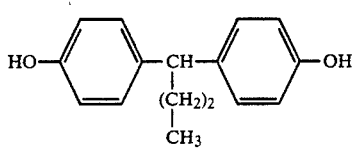

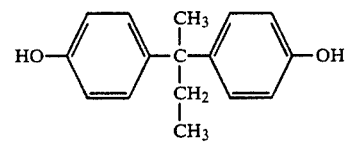

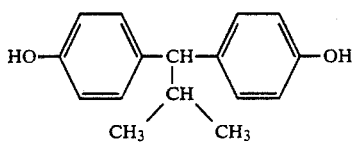

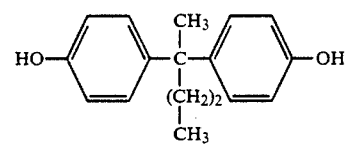

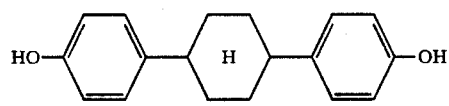

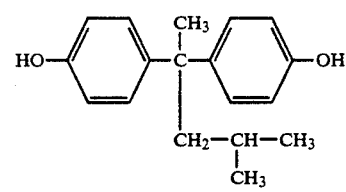

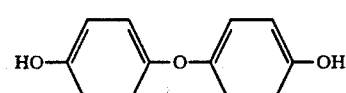

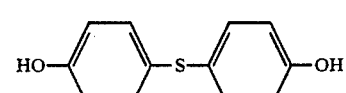

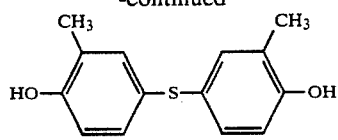

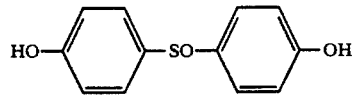

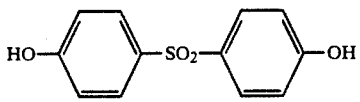

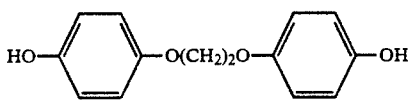

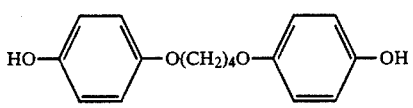

The following are particularly suitable bisphenols: bis-(4-hydroxyphenyl)-methane, bis-(4-hydroxy-3,5-dimethylphenyl)-methane, 2,2-bis-(4-hydroxyphenyl)-propane, 2,2-bis-(4-hydroxy-3,5-dimethylphenyl)-propane, 2,2-bis-(4-hydroxy-3,3′-dimethylphenyl)-propane, 1,1-bis-(4-hydroxyphenyl)-cyclohexane, bis-(4-hydroxyphenyl) sulphone, bis-(4-hydroxy-3,5-dimethyl-phenyl) sulphone and bis-(4-hydroxyphenyl) sulphide.

The bisphenols mentioned can be employed on their own or as mixtures.

Bis-(4-hydroxyphenyl)-methane and bis-(4-hydroxyphenyl)-propane are very particularly preferred.

The last-mentioned products can also be used in their crude quality, that is to say contaminated with the corresponding 2,4-isomers and with small amounts of bisphenols having an indan structure or chroman structure and also with the homologous trinuclear trisphenols.

The use of phenols for improving special properties of polyamides has admittedly been known for a long time.

Thus sterically hindered phenols, that is to say phenols substituted in at least one o-position, preferably in all the o-positions, relative to the phenolic OH group by $\geq C_3$ groups (for example t-butyl or cyclohexyl), are used as heat stabilizers in polyamides.

However, owing to their steric hindrance and owing to the high proportion of aliphatic C atoms in the phenol molecules, these products exhibit, in fairly high concentrations, compatibility problems (exudation!) and, in addition, are fairly expensive.

Special phenols which result in an improved resistance to deformation in fibres, bristles and yarns were employed in DOS (German Published Specification) 1,769,662, it being also absolutely necessary for phenols having less than 4 benzene rings to carry secondary or tertiary alkyl groups, that is to say groups making high steric demands, in one or both o-positions relative to the phenolic OH groups.

These polyphenols are also not very useful within the scope of the invention.

DOS (German Published Specification) 1,912,111 describes plasticized polyamides containing, as plasticizer components, mixtures of esters of long-chain carboxylic acids and phenolic compounds.

In this publication, as in the other publications mentioned previously, there is no reference to polyamides which have been impact-modified by alloying.

The use of monophenols for reducing the water absorption of partly crystalline polyamides is recommended in DOS (German Published Specification) 3,248,329.

At fairly high concentrations, the monophenols mentioned therein tend to exude and to form a coating, probably also because of the low content of phenolic groups in the monophenols.

The bisphenols to be employed in accordance with the invention are added to the impact-modified moulding materials based on polyamides to the extent of preferably 5–35% by weight and particularly preferably 10–30% by weight, relative to the polyamide content.

The polyamides used can be linear polycondensates formed from diamines and dicarboxylic acids, such as polyamide 6,6, 6,7, 6,8, 6,9, 6,10, 6,12, 8,8 or 12,12, from amino acids or from the corresponding lactams having at least 5 C atoms, such as, for example, ε-caprolactam or laurolactam, or can be polycondensates formed from aromatic dicarboxylic acids, such as isophthalic acid or terephthalic acid, and diamines, such as hexamethylenediamines or octamethylenediamine, or from araliphatic starting materials, such as m-xylylenediamines or p-xylylenediamines and adipic acid, suberic acid or sebacic acid, or polycondensates based on alicyclic starting materials, such as cyclohexanedicarboxylic acid, cyclohexanediacetic acid, diaminodicyclohexylmethanes or isophoronediamine.

It is preferable to use partly crystalline polyamides, particularly preferably PA 6 and PA 6,6, in particular polyamides having relative viscosities (measured in a 1% solution in m-cresol at 25° C.) of 1.6–2.5 in the case of amorphous polyamides and of 2.5–5.0, preferably 2.7–4.5, in the case of partly crystalline polyamides.

The moulding materials according to the invention contain, relative to the PA content, 5–60% by weight, preferably 10–40% by weight and particularly preferably 12–30% by weight, of the impact-modifying component.

The bisphenols to be employed in accordance with the invention are particularly effective in the sense of greatly improved flow and hence facilitated processing when they are in alloys of the polyamides mentioned, particularly preferably partly crystalline polyamides, and known diene and/or acrylic rubbers which preferably contain, as structural units, proportions of polar groups, such as butadiene polymers, which can also be copolymerized with comonomers, such as, for example, acrylonitrile, (meth)acrylic acid and/or (meth)acrylic acid esters or can be grafted into a core/shell structure.

Polymers of this type which are suitable for increasing the toughness of polyamides have been known for a long time and are mentioned, for example, in German Patent Specification 2,444,584 (=U.S. Patent Specification 4,022,748) and DE-OS (German Published Specification) 2,726,256 (=U.S. Patent Specification 4,096,202).

The following are examples of suitable ratios in the moulding materials according to the invention:
55–85% by weight of polyamide,
10–30% by weight of the rubber component and
5–15% by weight of bisphenols,
it being always necessary for the sum of the components to total 100% by weight.

The products according to the invention for producing toughened moulding materials based on polyamides can be prepared by mixing the polyamide component, the rubber component and the bisphenol component together above the melting point of the polyamide. This can be carried out, for example, immediately after the preparation of the polyamide, by mixing the bisphenol modifier into the melt which is to be spun out in the form of a ribbon, alloying with the rubber components then being carried out subsequently. However, it is preferable to prepare the polyamides modified in accordance with the invention by mixing all the starting components, that is to say the polyamide, the impact-modifying polymer partner and the bisphenol component, in customary screw extruders.

An analogous procedure can be followed when additionally incorporating other additives, such as, for example, dyestuffs or mould release auxiliaries.

The bisphenol component can therefore be metered in together with the polyamide component at as early a stage as the feed hopper of the extruder, or can be added to the materials to be extruded at a later time during the extrusion.

Customary known equipment is suitable for compounding. It is preferable to employ twin-screw extruders.

Compared with comparable moulding materials containing no bisphenols, the free-flowing, impact-modified polyamide moulding materials according to the invention have an otherwise essentially constant pattern of properties and are distinguished by greatly improved flow and easier processability and by blemish-free surfaces and in the case of large mouldings from moulds having several sprues) fewer joint line markings. In individual cases it is additionally even possible to achieve an improvement in stability to the effects of moisture, inorganic salts, heat and UV light ("weathering stability").

The new moulding materials are particularly suitable for the production of mouldings by the injection-moulding process, in particular for mouldings having a large surface and complicated mouldings which otherwise can only be produced at a high technical outlay during processing and with surface blemishes or often not at all.

The products are preferentially suitable for applications in automobile construction (bumpers, spoilers and body components).

EXAMPLE 1

70 parts by weight of a polyamide 6 having a relative viscosity of 2.9, 30 parts by weight of an elastomer I (graft polymer consisting of 80% of graft base composed of crosslinked polybutadiene—gel content >70%, measured in toluene—and of 20% of grafted-on material composed of methyl methacrylate) and 10 parts by weight of bisphenol A are metered separately, but simultaneously, into a type ZSK 32 twin-screw extruder, and are extruded at 90 rpm and 260° C.

The work absorbed in the extruder under the conditions mentioned was 23 A, and without the added bisphenol was 38 A.

The product melt was discharged in the form of ribbon into a water bath, granulated, and dried to a water content of <0.05% by weight.

The measured properties of the product are listed in Table 1.

(Note: In the case of the comparison products, the amounts mentioned for the bisphenol component were additionally added in the form of polyamide to the parts by weight of polyamide).

EXAMPLES 2-10

Example 1 was repeated, with the difference that the individual components for the preparation shown in Table 1 were employed.

The properties of the products prepared are also shown in Table 1 (comparison figures without added bisphenol are in brackets).

TABLE 1

| Example | PA component type ($\eta_{rel}$) | Parts by weight | Elastomer component Type | Parts by weight | Bisphenol, Parts by weight | Work absorbed in the extruder [A] | Flow length, cm* | Modulus of elasticity $E_b$ (MPa) |
|---|---|---|---|---|---|---|---|---|
| 1 | PA 6 (2.9) | 60 | I | 30 | 10 bisphenol A | 23 (38) | 44 (28) | 1750 (1550) |
| 2 | PA 6 (2.9) | 50 | I | 30 | 20 bisphenol A | 12 (38) | 83 (28) | 1640 (1550) |
| 3 | PA 6 (3.5) | 50 | I | 30 | 20 bisphenol A | 22 (64) | 58 (17) | 1670 (1600) |
| 4 | PA 66 (3.9) | 60 | I | 20 | 20 bisphenol A | 14 (70) | 59 (20) | 2350 (2000) |
| 5 | PA 6 (3.5) | 70 | II | 20 | 10 bisphenol A | not measured | 68 (45) | 2180 (2000) |
| 6 | PA 66 (2.9) | 65 | I | 30 | 5;2,2',6,6'-tetramethyl-bisphenol A | 30 (42) | 40 (30) | 1780 (1670) |
| 7 | PA 6 (2.9) | 60 | I | 30 | 10;2,2',6,6'-tetramethyl-bisphenol A | 20 (38) | 44 (28) | 1760 (1550) |
| 8 | PA 6 (2.9) | 65 | I | 30 | 5; bisphenol A | 24 (42) | 37 (28) | 1600 (1550) |
| 9 | PA 6 (2.9) | 70 | I | 20 | 10 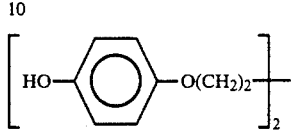 | 25 (36) | 55 (38) | 1820 (1740) |
| 10 | PA 6 (3.5) | 70 | III | 20 | 10 as in Example 1 | not measured | 72 (47) | 2310 (2100) |

Elastomer II: crosslinked acrylic rubber based on a core/shell structure composed of a core based on crosslinked polybutadiene and two different shell structures (according to graft product K of European Patent 0,083,446).
Elastomer III: crosslinked acrylic rubber having a core/shell structure and with methyl methacrylate in the graft shell (acrylic rubber KM 330 made by Röhm + Haas)
*The flow length is a measure of the flow of a product and hence of its processability; a higher flow length denotes better flow and hence shorter injection moulding cycles. The flow length was determined as follows: The sample to be investigated is injected, at an injection pressure of 72 bar, by means of an injection-moulding machine having a barrel temperature of 260° C., into a special mould which is kept at 90°. Materials which flow particularly readily are capable under these conditions of filling the mould, so that a spiral 100 cm long can afterwards be taken off. Materials which flow less readily only fill the mould partly under the conditions described; because of the premature solidification of the melt, it is then possible to obtain only spirals of a length <100 cm.
The flow length is quoted as the length in cm which has been reproduced 5 times.

and acrylic rubber is 10 to 40%, by weight, relative to the polyamide content.

2. A moulding material according to claim 1, in which the polyamide employed is a partly crystalline polyamide.

3. A moulding material according to claim 1, containing 12 to 30% by weight relative to the polyamide content, of the diene and/or acrylic rubber.

4. A moulding material according to claim 1, in which the bisphenol is bisphenol A.

5. A shaped article whenever obtained from a moulding material according to claim 1.

6. A moulding material according to claim 1 wherein the polyamide is a linear polycondensate of a diamine and a dicarboxylic acid, a polycondensate of an amino acid or a corresponding lactam or a polycondensate of an aromatic dicarboxylic acid and a diamine.

7. A polyamide moulding material according to claim 1 which contains:
44–85% by weight of polyamide,
10–30% by weight of rubber component, and
10–20% by weight of bisphenols.

8. A polyamide moulding material according to claim 7 where the polyamide is polyamide-6 or polyamide-66, the rubber is a polybutadiene graft rubber or an acrylic rubber with a core/shell structure, and the bisphenol is bisphenol-A or tetramethyl bisphenol-A.

* * * * *

We claim:

1. A polyamide moulding material which can be processed by thermoplastic means and contains diene or acrylic rubber or both, and contains 10% to 20% by weight, relative to the polyamide content, of at least one bisphenol selected from the group consisting of dihydroxydiphenyls, bis-(hydroxyphenyl)alkanes, bis-(hydroxyphenyl)-cycloalkanes, bis-(hydroxyphenyl) sulphides, bis-(hydroxyphenyl) ethers, bis-(hydroxyphenyl) ketones, bis(hydroxyphenyl) sulphoxides, bis-(hydroxyphenyl) sulphones and, bis-(hydroxyphenyl)-diisopropylbenzenes, and wherein the amount of diene

UNITED STATES PATENT AND TRADEMARK OFFICE
CERTIFICATE OF CORRECTION

PATENT NO. : 5,212,224
DATED : May 18, 1993
INVENTOR(S) : Meyer et al

It is certified that error appears in the above-indentified patent and that said Letters Patent is hereby corrected as shown below:

On the title page, under item [56] References Cited, "U.S. PATENT DOCUMENTS" should read as follows:

U.S. PATENT DOCUMENTS

| | | | |
|---|---|---|---|
| 2,374,576 | 4/1945 | Brubaker | 260/18 |
| 3,207,620 | 9/1965 | Roth | 117/33.5 |
| 4,338,406 | 7/1982 | Sanderson et al. | 525/66 |

At column 8, line 52, "44-85%" should correctly read -- 55-85% --.

Signed and Sealed this

First Day of February, 1994

*Attest:*

BRUCE LEHMAN

*Attesting Officer*     *Commissioner of Patents and Trademarks*